(12) United States Patent
Rodriguez et al.

(10) Patent No.: US 8,826,675 B2
(45) Date of Patent: Sep. 9, 2014

(54) THERMAL SYSTEM HAVING ELECTRICAL DEVICE

(75) Inventors: Rigoberto Rodriguez, Avon, IN (US); Steven Gagne, Avon, IN (US); Donald W. Burns, Avon, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 149 days.

(21) Appl. No.: 13/451,663

(22) Filed: Apr. 20, 2012

(65) Prior Publication Data

US 2012/0266613 A1    Oct. 25, 2012

Related U.S. Application Data

(60) Provisional application No. 61/477,202, filed on Apr. 20, 2011.

(51) Int. Cl.
*F25D 25/00* (2006.01)
*H02K 9/12* (2006.01)
*H02K 9/14* (2006.01)

(52) U.S. Cl.
CPC ... *H02K 9/12* (2013.01); *H02K 9/14* (2013.01)
USPC .......................................................... 62/62

(58) Field of Classification Search
CPC .................................. H02K 9/14; H02K 9/12
USPC ............... 62/62, 259.2, 503, 505; 310/58, 52; 361/689, 700
See application file for complete search history.

(56) References Cited

U.S. PATENT DOCUMENTS

| | | | |
|---|---|---|---|
| 2,891,391 A | 6/1959 | Kocher et al. | |
| 3,188,833 A | 6/1965 | Robinson | |
| 4,903,497 A * | 2/1990 | Zimmern et al. | 62/113 |
| 7,352,090 B2 | 4/2008 | Gustafson et al. | |
| 7,591,147 B2 * | 9/2009 | Masoudipour et al. | 62/505 |
| 7,602,089 B2 | 10/2009 | Kabata et al. | |
| 7,663,272 B2 | 2/2010 | Oyoung et al. | |
| 8,162,626 B2 * | 4/2012 | Fukasaku et al. | 417/410.1 |
| 2009/0241592 A1 * | 10/2009 | Stover | 62/503 |
| 2009/0314018 A1 * | 12/2009 | Burchill et al. | 62/228.4 |

* cited by examiner

*Primary Examiner* — Mohammad M Ali
(74) *Attorney, Agent, or Firm* — Krieg DeVault LLP

(57) ABSTRACT

A thermal system is disclosed in thermal communication with an electrical device. In one form the thermal system is a refrigeration system. The electrical device can be disposed within the refrigeration system such that a working fluid of the refrigeration system exchanges heat with the electrical device. In one embodiment the refrigeration system includes a container in which the electrical device is disposed. The electrical device can be an electrical motor, but other forms are contemplated. The container can be located anywhere in the thermal system. In one non-limiting embodiment the working fluid of the refrigeration system wets a stator of the motor. A partition can be used to separate the stator from the motor to keep the motor free from working fluid.

19 Claims, 3 Drawing Sheets

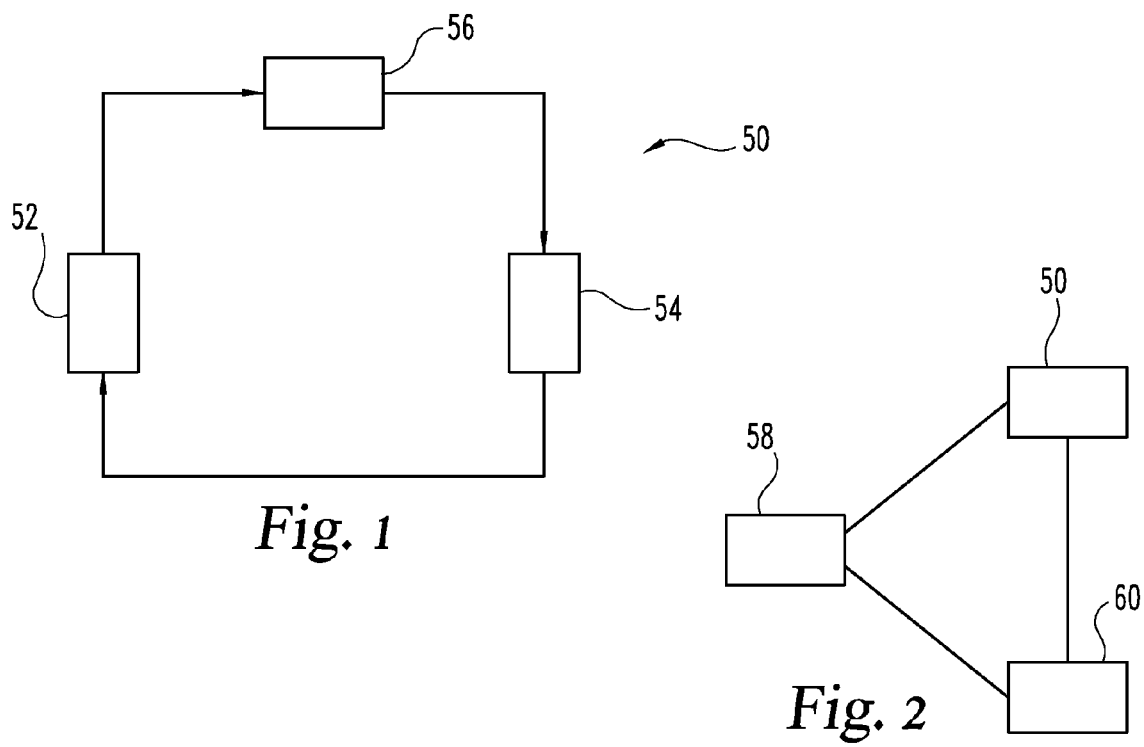
Fig. 1
Fig. 2
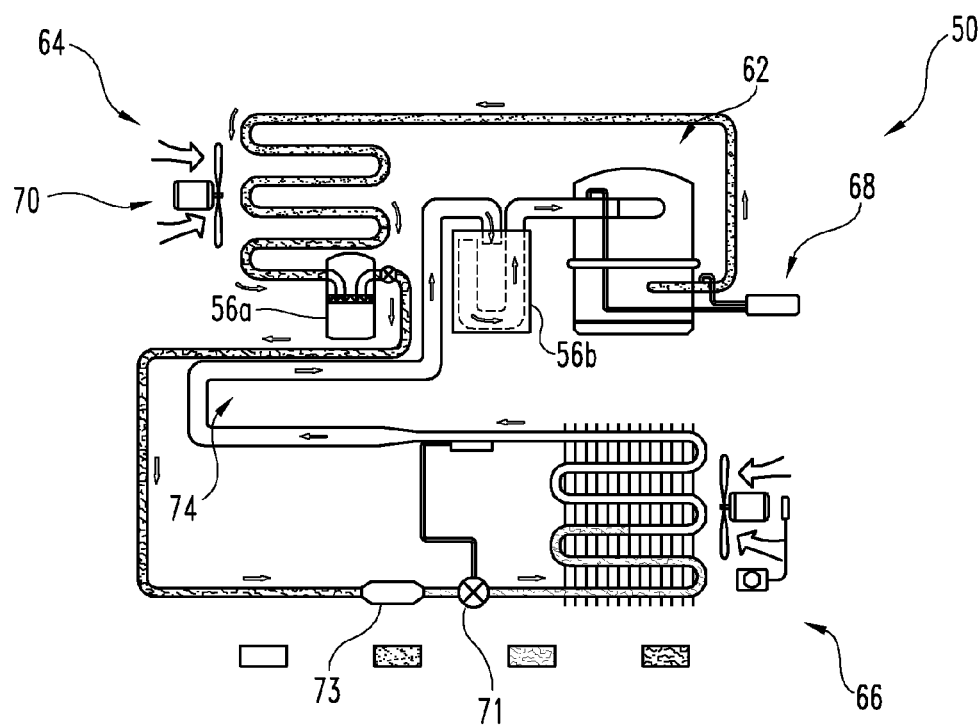
Fig. 3

US 8,826,675 B2

THERMAL SYSTEM HAVING ELECTRICAL DEVICE

CROSS REFERENCE

The present application claims the benefit of U.S. Provisional Patent Application No. 61/477,202, filed Apr. 20, 2011, which is incorporated herein by reference.

TECHNICAL FIELD

The present invention generally relates to thermal systems and work components, and more particularly, but not exclusively, to exchanging heat between a thermal system and heat producing device.

BACKGROUND

Using thermal systems to exchange heat with work components remains an area of interest. Some existing systems have various shortcomings relative to certain applications. Accordingly, there remains a need for further contributions in this area of technology.

SUMMARY

One embodiment of the present invention is a unique combination of thermal system and electrical device. Other embodiments include apparatuses, systems, devices, hardware, methods, and combinations for conveying heat between a working fluid and an electrical device. Further embodiments, forms, features, aspects, benefits, and advantages of the present application shall become apparent from the description and figures provided herewith.

BRIEF DESCRIPTION OF THE FIGURES

FIG. 1 depicts one embodiment of a thermal system.
FIG. 2 depicts an embodiment of a thermal system, internal combustion engine, and a vehicle.
FIG. 3 depicts one embodiment of a thermal system.

DETAILED DESCRIPTION OF THE ILLUSTRATIVE EMBODIMENTS

Figure 4:
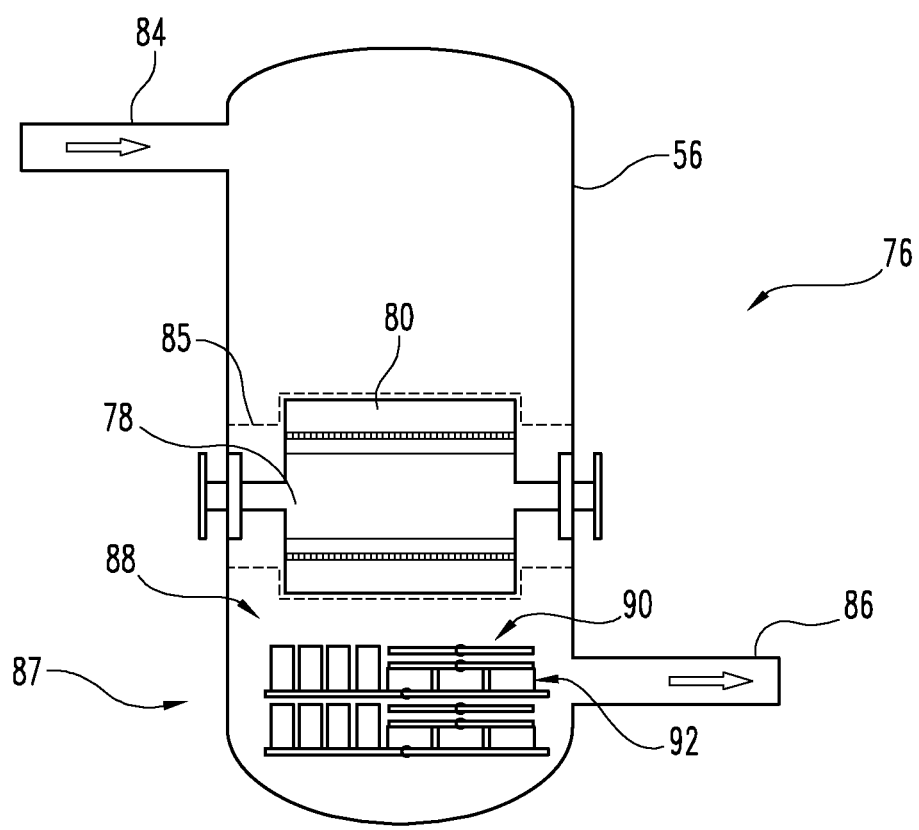
FIG. 4 depicts one embodiment of a container.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a thermal system 50 is disclosed and is structured to move heat from one region to another region. In one non-limiting example the thermal system 50 can be a cyclic refrigeration system of the vapor-compression type, one form of which will be discussed further herein. Other forms of thermal system 50 are contemplated herein. In the illustrated embodiment the thermal system 50 includes a left side thermal system member 52 and a right side thermal system member 54 each of which is in thermal contact with a matter with which the members exchange heat. The terms "left" and "right" are used for illustrative purposes only to differentiate between components of the thermal system 50 and are not meant to imply a strict spatial location in any given embodiment. Either or both the left and right side thermal system members 52 and 54 can be used to exchange heat with a fluid such as air to either cool or heat the fluid. In other embodiments the left and/or right side thermal system members 52 and 54 can be used to cool or heat a liquid matter and/or a solid matter, to set forth just a few more non-limiting embodiments. In short, the thermal system 50 can include a number of embodiments that move heat in a variety of ways between any number of matter types.

The thermal system 50 can include a working fluid that circulates between the left and right side thermal system members 52 and 54, one embodiment of which is shown in FIG. 1. The working fluid can take on a variety of forms. The working fluid can also take on any variety of physical states, such as vapor, liquid, or solid, and furthermore can remain in that state within the thermal system 50 or can change state. In the example of a vapor-compression embodiment the working fluid can transition between liquid and vapor as it circulates through the thermal system 50 to provide for movement of heat between regions.

The thermal system 50 can include a container 56 that acts as a space for the receipt of a circulating working fluid from a passage, conduit, or other like device. In one form a cross sectional area at one or more locations in the container 56 relative to a cross sectional area of the passage leading to the container 56 permits the working fluid to flow through the container 56 at a lower speed. In such a manner the container 56 can be a large space relative to the passage which permits working fluid to collect and dwell longer than in the passage.

In one or more embodiments to be discussed further below the container 56 can be in contact with an electrical device. The electrical device can take many different forms and can be embedded, either in whole or in part, within the container. In one non-limiting form the electrical device can be an electrical motor, whether a relatively low powered motor or a relatively high powered motor. In other forms the electrical device can be a generator. In still other forms the electrical device can be power and/or control electronics. In still further non-limiting forms the electrical motor can be an electrical motor and the power and/or control electronics. Further details of embodiments incorporating the container 56 and electronics will be described further below.

In at least one non-limiting embodiment described above in which the thermal system 50 is in the form of a vapor-compression cycle, one of the left and right side thermal system members 52 and 54 can be an evaporator while the other can be a condenser. Though not depicted, the embodiment can also include a compressor, pump, or other device useful to increase the density of the working fluid upstream of the condenser. The container 56 in these embodiments can be located at a number of different positions relative to the components of the thermal system 50. In one non-limiting example the container 56 is located as an accumulator downstream of an evaporator and upstream of a compressor. In another non-limiting example the container 56 is located as a receiver tank downstream of a condenser and upstream of an evaporator.

Turning now to FIG. 2, one embodiment of the thermal system 50 can be used in conjunction with a vehicle 58 having an internal combustion engine 60 to cool one or more components/systems/etc of the vehicle 58 and/or engine 60. In one embodiment the vehicle 58 can take the form of an aircraft. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, embodiments of the present application are contemplated for utilization in other instances that may not be coupled with an aircraft such as, for example, industrial applications, power generation, pumping sets, naval propulsion, weapon systems, security systems, perimeter defense/security systems, and the like known to one of ordinary skill in the art.

The thermal system 50 can be used in conjunction with an internal combustion engine 60 that is associated with the vehicle 58. In one form the internal combustion engine 60 is a gas turbine engine, but other forms are also contemplated herein. The internal combustion engine 60 can be used with the vehicle 58 to provide power, whether in the form of propulsive or non-propulsive power, or a combination of the two. The internal combustion engine 60 can also be used to provide power, in whole or in part, to the thermal system 50, such as to a component(s) of the thermal system 50.

FIG. 3 depicts one embodiment of the instant application in which the thermal system 50 is in the form of a vapor-compression refrigeration system. The thermal system 50 includes a compressor 62, condenser 64, and an evaporator 66, among various other possible components. It will be appreciated that the embodiment depicted in FIG. 3 is a non-limiting form of the thermal system 50 and various other combinations/alternatives/arrangements are also contemplated herein. Various conduits/passages couples each of the components of the thermal system 50 and act to convey a working fluid throughout the system.

The compressor 62 can take on a variety of forms suitable for increasing a pressure of the working fluid in the thermal system 50. In one non-limiting form the compressor 62 is a hermetic compressor that includes a pressure cutout 68 intended to regulate the compressor based upon pressures in the working fluid near an inlet to the compressor and near an outlet of the compressor. Not all forms of the compressor 62 need include a pressure cutout. Other forms of the compressor 62, as well as alternative and/or additional features such as the pressure cutout 68, are contemplated herein.

The condenser 64 can include a fan 70 that acts to increase heat transfer between the working fluid in the thermal system 50 and a mass conveyed by the fan 70. In some forms the condenser 64 may not include the fan 70, including those embodiments where a passing air stream is used to cool the condenser 64. Such a passing airstream could be provided by, or diverted from, a forward motion of the thermal system 50 relative to an air mass, such as if the system 50 were mounted in a moving vehicle. The passage/conduit that conveys the working fluid through the condenser can take a variety of forms and in one non-limiting embodiment shown in the Figure includes a number of bends and/or turns to increase the residence time of the working fluid within a heat transfer area of the condenser 64. The condenser can also include a finned or pin array heat exchanger that utilizes either bypass air from a gas turbine engine or ram air to condense working fluid in the vapor state to a liquid state. The fan 70 can be powered by an electric motor but other sources of power are contemplated herein.

The evaporator 66 in the illustrated embodiment is used to change the phase of the working fluid and in so doing absorb heat from its surroundings. In one form the evaporator 66 can include a restrictor or valve 71 used to reduce a pressure of the working fluid. In one form the restrictor or valve 71 can be used to change phase of the working fluid from a liquid to a vapor. The valve 71 can also be used to regulate a flow rate of the working fluid to the evaporator 66. The valve 71 can take a variety of forms such as an expansion valve or a capillary tube to set forth just two non-limiting examples. In one embodiment the liquid working fluid can be at a relatively high pressure while the vapor working fluid can be at a relatively low temperature and pressure. The evaporator can be used to receive a relatively low pressure working fluid and, if not already converted to a vapor through action of the restrictor or valve 71, can further be used to receive heat from the surroundings and change the phase of the working fluid. In such a manner the evaporator may be considered that portion of the thermal system 50 in which the working fluid is being changed from one physical state to the other. Different types of evaporators can be used to absorb heat from the surroundings are contemplated for use with the thermal system 50.

Also depicted in FIG. 3 is a strainer or drain 73 located on the high pressure side of the thermal system 50 between the condenser 64 and evaporator 66. Other locations are contemplated herein.

A container 56a can be located between the condenser 64 and the evaporator 66 and in the illustrated embodiment is constructed to receive a liquid phase of the working fluid from the condenser 64. The container 56a can be any configuration and have any variety of shapes and sizes. In one form the container 56a is coupled with a liquid line valve 72 which can permit substantial passage of a liquid working fluid downstream of the container 56a to the evaporator 66. In the illustrated embodiment a liquid working fluid enters and exits the container 56a near the top of the container 56a, but other locations for either or both the inlet and exit are contemplated herein.

Alternatively and/or additionally, another container 56b can be located between the evaporator 66 and the compressor 62. In the illustrated embodiment the container 56b is constructed to receive a vapor phase working fluid from the evaporator 66. The container 56b can have any configuration and have any variety of shapes and sizes. In the illustrated embodiment a liquid working fluid enters and exits the container 56b near the top of the container 56b, but other locations for either or both the inlet and exit are contemplated herein. The containers 56a and 56b can have unique configurations. In some forms, however, the containers can have similar configurations. Furthermore, any given embodiment of the thermal system 50 can have one or both of the containers 56a and 56b. In other embodiments additional containers can be used.

Though not depicted in the illustrated embodiment of the thermal system 50, a recirculation pump can be used with the condenser 64 to account for variations in attitude and/or accelerations of the thermal system 50 that can be caused by a maneuvering vehicle 58. Such a recirculation pump can be used to suction liquid from the condenser, such as from the condenser coils in those embodiments that include coils, and deliver the liquid to the container 56a.

A relatively low pressure portion of the thermal system 50 can be placed into thermal communication with a relatively high pressure portion. In the illustrated embodiment a return line to the compressor 62 can be placed into thermal communication with a supply line to the evaporator 66 near the reference numeral 74, but other portions of the thermal system 50 different than those depicted can be placed into contact with each other. Not all embodiments need include a relatively low pressure portion in thermal communication with a relatively high pressure portion.

Turning now to FIG. 4, one embodiment of the container 56 is depicted in which a work device, such as but not limited to a heat producing device, is disposed within the thermal system 50. In the illustrated embodiment an electric motor 76 is disposed within the container 56 and is at least partially surrounded by working fluid. The electric motor 76 can be used to drive a shaft that is operable to provide work to a driven device external of the thermal system 50. The working fluid can be in physical and/or thermal contact with the electric motor 76. In the illustrated form the electric motor 76 includes a rotor 78 and stator 80 that are both surrounded by but partitioned from the working fluid through a containment 85. The rotor 78 can be supported by magnetic bearings in some forms. In some embodiments the containment 85 may only extend around a portion of the rotor 78 and/or stator 80 for example where those components are adjacent to a an exterior portion of the container 56, such as where the exterior extends only partially around the rotor 78 and/or stator 80. The containment 85 can form part of the container 56 and can be made of any material sufficient to separate the working fluid in the container 56 from the electric motor 76. The working fluid in the container 56 is permitted to flow past the containment 85 as it progresses from the inlet 84 to the outlet 86 and is used to transfer heat with the heat producing component on the other side of the containment 85. In some forms the containment 85 can be integral with the container 56 or can be coupled thereto. The containment 85 can have any shape useful to separate the heat producing component from the working fluid, and in the illustrated embodiment the containment 85 takes a cylindrical form. The containment can extend to opposite portions of the container 56 as shown in the illustrated embodiment, but in some forms the containment may only extend partially across the containment. To set forth just one non-limiting example, the containment may take the form of a closed end cylindrical shape in instances in which the heat producing device is supported on only one end. In this non-limiting example, the containment 82 can enclose the heat producing device as it protrudes into the interior of the container 56, but if supported on only one end then the containment 82 can be coupled to only one side of the container 56. Other variations of the containment 82 are contemplated herein.

In any of the various embodiments described herein, the working fluid can remain in the physical state in which it entered the container 56 (e.g., liquid, vapor) but in some forms the working fluid may change state either in whole or in part as the working fluid is conveyed through the container 56 to other components of the thermal system 50. To set forth just a few non-limiting examples, the working fluid can remain in the same state as it exchanges heat with components located within the container 56, such as but not limited to the electric motor 76, while in other forms the working fluid can change state either in whole or in part within the container 56. In some embodiments it is envisioned that the primary mechanism through which the heat producing device is cooled (i.e. the electric motor 76 of the embodiment in FIG. 4) is via action of in-state heat transfer, that is, heat transfer in which the working fluid substantially or wholly remains in a given state.

The container 56 in the illustrated embodiment includes an inlet 84 disposed near the top of the container 56 and an outlet 86 disposed near the bottom. Other configurations are also contemplated herein. The container 56 shown in FIG. 4 can represent either or both of the containers 56a and 56b described in the embodiments above.

The container 56 can be any volume in the thermal system 50 in which working fluid can be used to transfer heat with the heat producing device, such as the electric motor 76. Though the embodiment of the container 56 is shown having a relatively distinct inlet 84, not all embodiments need have an opening into the volume that is as distinct. For example, the volume that is the container 56 can be a portion of the thermal system 50 in which a gradually widening of the passage occurs that leads to a portion containing the heat producing device. In this way the opening could be considered to be a location or area in proximity to the gradual widening of the passage, or it could be the transition from the gradual widening to the transition between it and the portion containing the heat producing device. In short, the opening can be a structure, or portion of the structure apart from a nominal passage for the working fluid as it flows between components. The exit of the container 56 can have similar characteristics as the opening.

FIG. 4 also discloses power electronics 87 that are disposed within the container 56 and is at least partially surrounded by working fluid such that heat can be exchanged between the two. In the illustrated embodiment the power electronics 87 are submerged within the working fluid contained in the vessel but the arrangement of the power electronics and container 56 can take similar forms to those described above regarding the heat transfer and physical relationship of the heat producing device such as the electric motor 76 and container 56. The power electronics 87 can be any component, device and/or assortment useful to transmit and/or modify electrical energy such as controlling and converting electrical power to and from the electric motor 76. Examples of power electronics include, but are not limited to converters, rectifiers, and inverters. The power electronics 87 can include various passive components 88, controller(s) 90, and switching components 92, among potential others. Various components can be used within the power electronics such as, but not limited to transistors (e.g. IGBTs, MOSFETs), thyristors (e.g. GTOs, IGCTs), diodes, inductors, capacitors, etc. Furthermore, the power electronics 87 can include a laminated bus structure 89 having embedded power conductors useful to place various components of the power electronics 87 into electrical communication with each other. The bus structure 89 can include any number of layers. For example, any given embodiment can have one or more layers of an electrically conductive material and an insulating material. In some forms the bus structure 89 may only have a single layer. Various configurations of devices described above are contemplated herein. Other devices in addition or alternative to than those described herein are also contemplated in various configurations of the power electronics 87. One or more power electronics 87 devices can be located within the container 56 such that one or more power conduits are routed through the container 56 and coupled to either or both the electric motor 76 and the power electronics 87.

One or more power conduits can be coupled between the power electronics 87 and the motor 76, though in some embodiments the power electronics 87 and motor 76 need not necessarily be coupled. Furthermore, one or more power conduits can be routed between either or both the motor 76 and the power electronics 87 and a device located external of the container 56. To set forth just a few non-limiting examples, an electrical conduit can be routed between a location external the container 56 and the power electronics 87, as well as another between the power electronics 87 and the motor 76. In another example a power conduit can be routed between a location external the container 56 and the motor 76, and another conduit between the motor 76 and the power electronics 87. In some forms the power electronics 87 can provide power to an electrically driven device located outside of the thermal system 50, while in other forms the power electronics 87 can provide power to the electrical device 76. Such a device external of the thermal system 50 driven by the motor 76 can be associated with the vehicle 58, such as, but not limited to, being carried by the vehicle 58.

The power conduits that couple the power electronics 87 and electrical motor 76, as well as any other device, can take the form of a conductive material and can be configured to carry a variety of electrical loads. Not all power conduits need be the same in any of configuration, size, material, etc. In some forms one or more portions of a power electronics 87 package associated with the electric motor 76 can be located outside of the container 56. In some forms the entire power electronics 87 can be found outside of the container 56 while the electric motor 76 is located within the container 56, among other possibilities.

Figure 5:
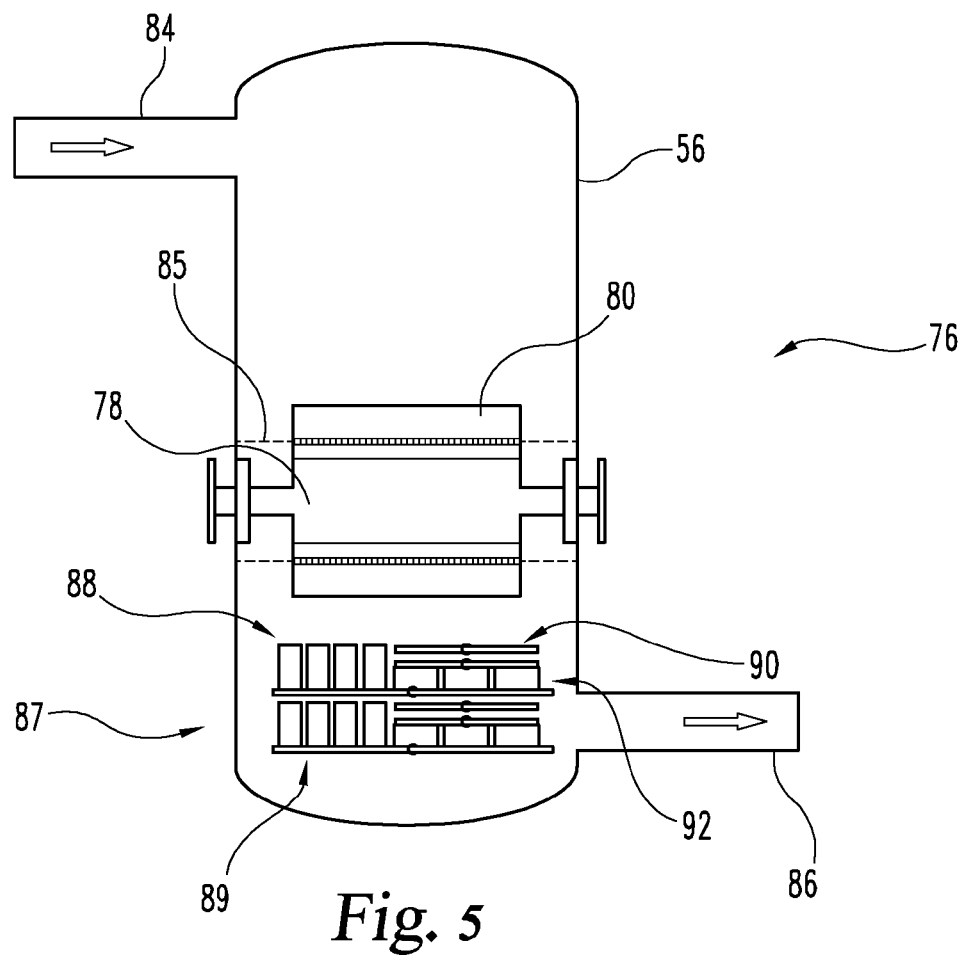
FIG. 5 depicts one embodiment of a container.

FIG. 5 depicts another embodiment in which a portion of the heat producing device in the form of the electrical motor 76 is in contact with the working fluid. In this embodiment the stator 80 is exposed to the working fluid in the thermal system 50, whether the working fluid is in a liquid state or vapor state. For example, the stator 80 can be infused such that working fluid resides or is capable of flowing between windings of the stator 80. The working fluid can flow between the windings or can be relatively stagnant depending on the configuration of the container 56, the pressure field and temperature gradients within the container 56, among other possible factors. The containment 85 can be located in a gap between the stator 80 and rotor 78.

Figure 6:
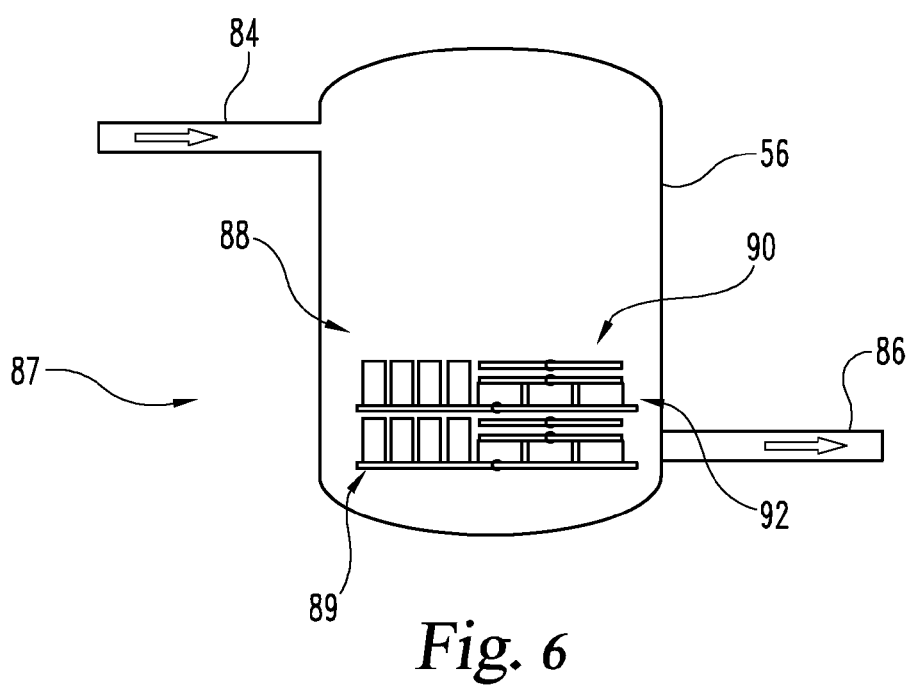
FIG. 6 depicts one embodiment of a container.

FIG. 6 depicts yet another embodiment of the container 56 in which power electronics 87 are located within the container 56 that does not include a heat producing device such as the electric motor 76.

One aspect of the present application includes an apparatus comprising a refrigeration fluid receiving vessel for receiving a volume of refrigerant in a cyclic refrigeration system, the vessel having a first opening to receive the refrigerant from a first portion of a refrigeration system and a second opening to deliver the refrigerant to a second portion of the refrigeration system, and an electrical motor at least partially contained within the refrigeration fluid receiving vessel.

A feature of the present application includes wherein the electrical motor includes a rotor and a stator.

Another feature of the present application includes wherein the stator is fluidically isolated from the refrigerant via a wall, and wherein the rotor is enclosed within the refrigeration fluid receiving vessel.

Still another feature of the present application includes wherein the stator is immersed in the refrigerant such that refrigerant is located between conductive windings of the stator, and which further includes a partition located between the stator and the rotor.

Yet still another feature of the present application includes wherein the refrigeration fluid receiving vessel is an accumulator positioned between a condenser and an evaporator of a vapor-compression refrigeration system, and which further includes power electronics in thermal communication with the refrigerant.

Still yet another feature of the present application includes wherein the refrigeration fluid receiving vessel is located between an evaporator and a compressor of the refrigeration system.

A further feature of the present application includes wherein the refrigeration fluid receiving vessel is incorporated on a low pressure side of the refrigeration system.

A yet further feature of the present application includes wherein the refrigeration fluid receiving vessel is incorporated on a high pressure side of the refrigeration system, and which further includes power electronics in thermal communication with the refrigerant.

Another aspect of the present application provides an apparatus comprising a cyclic refrigeration system having a working fluid, a thermal energy receiving member, and a thermal energy rejection member wherein heat travels with the working fluid from the thermal energy receiving member to the thermal energy rejection member, a vessel for storing a volume of the working fluid, and a motor disposed in the vessel such that the working fluid in the vessel receives heat from the motor.

A feature of the present application includes wherein the cyclic refrigeration system is a vapor-compression refrigeration system.

Another feature of the present application includes wherein the motor is an electrical motor having a rotor and a stator.

Still another feature of the present application further includes a power electronics device in electrical communication with the electrical motor.

Yet still another feature of the present application includes wherein a storage volume for the working fluid is delineated by a structure located radially further than the stator of the motor.

Still yet another feature of the present application includes wherein a physical boundary of the working fluid extends radially inward from a portion of an electrical motor stator.

A further feature of the present application includes wherein the electrical motor stator is wetted by the working fluid.

Yet another aspect of the present application provides a method comprising circulating a working fluid in a refrigeration system between a heat sink and a heat source, collecting the working fluid in a reservoir, and exchanging heat between the working fluid in the reservoir and a heat producing motor embedded in the reservoir.

A feature of the present application includes wherein the exchanging heat is apart from the heat sink and the heat source.

Another feature of the present application further includes conveying a working fluid through a volume in the reservoir prior to arriving at the heat producing motor.

Still another feature of the present application further includes flowing the working fluid through a stator of the motor.

Yet still another feature of the present application includes wherein the heat producing motor is an electrical motor having a rotor and a stator, which further includes rotating the rotor, and wherein a partition is disposed between the rotor and the stator.

A further feature of the present application includes wherein the collecting is on a low pressure side of the refrigeration system, and which further includes managing a power using electronics, the managing occurring within the reservoir.

A yet further feature of the present application includes wherein the refrigeration system is a vapor compression refrigeration system, wherein the collecting includes receiving a relatively high pressure working fluid downstream of a compressor, and which further includes transferring a heat between the working fluid and a power electronics device.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
   a refrigeration fluid receiving vessel for receiving a volume of refrigerant in a cyclic refrigeration system, the vessel having a first opening to receive the refrigerant from a first portion of a refrigeration system and a second opening to deliver the refrigerant to a second portion of the refrigeration system; and
   an electrical motor includes a rotor and a stator and the electric motor is at least partially contained within the refrigeration fluid receiving vessel;
   a partition located between the stator and the rotor; and
   wherein the stator is immersed in the refrigerant such that refrigerant is located between conductive windings of the stator and the partition acts to isolate the rotor from the refrigerant such that the rotor is not contacted by refrigerant.

2. The apparatus of claim 1, wherein the rotor is enclosed within the refrigeration fluid receiving vessel.

3. The apparatus of claim 1, wherein the refrigeration fluid receiving vessel is an accumulator positioned between a condenser and an evaporator of a vapor-compression refrigeration system, and which further includes power electronics in thermal communication with the refrigerant.

4. The apparatus of claim 1, wherein the refrigeration fluid receiving vessel is located between an evaporator and a compressor of the refrigeration system.

5. The apparatus of claim 1, wherein the refrigeration fluid receiving vessel is incorporated on a low pressure side of the refrigeration system.

6. The apparatus of claim 1, wherein the refrigeration fluid receiving vessel is incorporated on a high pressure side of the refrigeration system, and which further includes power electronics in thermal communication with the refrigerant.

7. An apparatus comprising:
   a cyclic refrigeration system having a working fluid, a thermal energy receiving member, and a thermal energy rejection member wherein heat travels with the working fluid from the thermal energy receiving member to the thermal energy rejection member;
   a vessel for storing a volume of the working fluid;
   a motor having a rotational portion and a stationary portion disposed in the vessel such that the working fluid in the vessel receives heat from the motor;
   a partition for fluidly separating the rotational portion and the stationary portion; and
   wherein the stationary portion is immersed in the refrigerant such that refrigerant flows between and cools conductive windings of the stationary portion and the partition prevents refrigerant from contacting the rotational portion of the motor.

8. The apparatus of claim 7, wherein the cyclic refrigeration system is a vapor-compression refrigeration system.

9. The apparatus of claim 7, wherein the motor is an electrical motor having a rotor and a stator.

10. The apparatus of claim 9, which further includes a power electronics device in electrical communication with the electrical motor.

11. The apparatus of claim 9, wherein a storage volume for the working fluid is delineated by a structure located radially further than the stator of the motor.

12. The apparatus of claim 7, wherein a physical boundary of the working fluid extends radially inward from the stationary portion of the motor.

13. A method comprising:
    circulating a working fluid in a refrigeration system between a heat sink and a heat source;
    collecting the working fluid in a reservoir;
    exchanging heat between the working fluid in the reservoir and a heat producing motor embedded in the reservoir;
    wherein the exchanging heat includes directly contacting windings of a stator with the working fluid; and
    preventing the working fluid from contacting a rotor of the motor.

14. The method of claim 13, wherein the exchanging heat is apart from the heat sink and the heat source.

15. The method of claim 13, which further includes conveying a working fluid through a volume in the reservoir prior to arriving at the heat producing motor.

16. The method of claim 15, which further includes flowing the working fluid through the stator of the motor.

17. The method of claim 13, wherein the heat producing motor is an electrical motor which further includes a partition disposed between the rotor and the stator.

18. The method of claim 13, wherein the collecting is on a low pressure side of the refrigeration system, and which further includes managing a power using electronics, the managing occurring within the reservoir.

19. The method of claim 13, wherein the refrigeration system is a vapor compression refrigeration system, wherein the collecting includes receiving a relatively high pressure working fluid downstream of a compressor, and which further includes transferring a heat between the working fluid and a power electronics device.

* * * * *